United States Patent
McAvoy et al.

(10) Patent No.: US 8,761,402 B2
(45) Date of Patent: Jun. 24, 2014

(54) SYSTEM AND METHODS FOR DIGITAL CONTENT DISTRIBUTION

(75) Inventors: Paul McAvoy, San Francisco, CA (US); Po Yuan, Milpitas, CA (US); Alson Kemp, San Jose, CA (US)

(73) Assignee: SanDisk Technologies Inc., Plano, TX (US)

( * ) Notice: Subject to any disclaimer, the term of this patent is extended or adjusted under 35 U.S.C. 154(b) by 843 days.

(21) Appl. No.: 11/863,714

(22) Filed: Sep. 28, 2007

(65) Prior Publication Data

US 2009/0086978 A1    Apr. 2, 2009

(51) Int. Cl.
  *H04L 9/08* (2006.01)
  *H04L 9/00* (2006.01)

(52) U.S. Cl.
  USPC .......................................... 380/279; 380/277

(58) Field of Classification Search
  USPC .............. 380/279, 277, 287; 725/25, 44, 116; 705/52; 711/100, 163, 164; 365/185.01
  See application file for complete search history.

(56) References Cited

U.S. PATENT DOCUMENTS

| | | | |
|---|---|---|---|
| 5,802,175 A | 9/1998 | Kara | |
| 6,857,071 B1 * | 2/2005 | Nakae | 713/156 |
| 6,865,550 B1 | 3/2005 | Cok | |
| 6,968,459 B1 | 11/2005 | Morgan et al. | |
| 6,981,152 B2 | 12/2005 | Du et al. | |
| 7,010,808 B1 | 3/2006 | Leung et al. | |
| 7,036,020 B2 | 4/2006 | Thibadeau | |
| 7,062,622 B2 | 6/2006 | Peinado | |
| 7,073,063 B2 | 7/2006 | Peinado | |
| 7,149,722 B1 | 12/2006 | Abburi | |
| 7,215,771 B1 | 5/2007 | Hamlin | |
| 7,426,747 B2 | 9/2008 | Thibadeau | |
| 7,493,656 B2 | 2/2009 | Goodwill et al. | |
| 7,549,044 B2 | 6/2009 | Lee et al. | |
| 7,549,057 B2 | 6/2009 | Sciupac | |

(Continued)

FOREIGN PATENT DOCUMENTS

| | | |
|---|---|---|
| EP | 1505595 A2 | 2/2005 |
| JP | 2001-075923 | 3/2001 |

(Continued)

OTHER PUBLICATIONS

International Search Report and Written Opinion of the International Searching Authority for International Application No. PCT/US2008/074428 dated Jan. 21, 2009, 17 pages.

(Continued)

*Primary Examiner* — Farid Homayounmehr
*Assistant Examiner* — Abu Sholeman
(74) *Attorney, Agent, or Firm* — Brinks Gilson & Lione

(57) ABSTRACT

Method and system for transferring encrypted content from a server to a storage device are provided. The method includes encrypting the content using a first key, wherein the server encrypts the content; establishing a secure communication channel between the server and the storage device using a random session key; sending the first key to the storage device via the secure communication channel; replacing the random session key with the first key; sending the encrypted content to the storage device after the random session key is replaced with the first key; decrypting the encrypted content using the first key, wherein the storage device decrypts the encrypted content; re-encrypting the decrypted content using a second key generated by the storage device; and storing the re-encrypted content at the storage device.

49 Claims, 4 Drawing Sheets

(56) References Cited

U.S. PATENT DOCUMENTS

| | | | |
|---|---|---|---|
| 7,567,671 B2* | 7/2009 | Gupte | 380/239 |
| 7,631,195 B1 | 12/2009 | Yu et al. | |
| 7,660,983 B1 | 2/2010 | Srivastava et al. | |
| 7,738,662 B2* | 6/2010 | Asano et al. | 380/277 |
| 7,818,587 B2 | 10/2010 | Drew et al. | |
| 8,051,302 B1 | 11/2011 | Hatanaka et al. | |
| 8,060,926 B1* | 11/2011 | Ebrahimi et al. | 726/12 |
| 2002/0034302 A1* | 3/2002 | Moriai et al. | 380/270 |
| 2002/0035492 A1* | 3/2002 | Nonaka | 705/5 |
| 2002/0184154 A1 | 12/2002 | Hori et al. | |
| 2002/0184492 A1 | 12/2002 | Hori et al. | |
| 2003/0041253 A1 | 2/2003 | Matsui et al. | |
| 2003/0161473 A1 | 8/2003 | Fransdonk | |
| 2005/0005148 A1* | 1/2005 | Ishibashi et al. | 713/193 |
| 2005/0125681 A1 | 6/2005 | Bressy et al. | |
| 2005/0210236 A1 | 9/2005 | Lee et al. | |
| 2005/0216763 A1* | 9/2005 | Lee et al. | 713/200 |
| 2006/0041905 A1* | 2/2006 | Wasilewski | 725/31 |
| 2006/0129490 A1 | 6/2006 | Collar et al. | |
| 2006/0155651 A1 | 7/2006 | Oh et al. | |
| 2006/0176839 A1* | 8/2006 | Frazer et al. | 370/312 |
| 2006/0210082 A1 | 9/2006 | Devadas et al. | |
| 2006/0218647 A1 | 9/2006 | Hars et al. | |
| 2006/0239450 A1 | 10/2006 | Holtzman et al. | |
| 2006/0271483 A1 | 11/2006 | Ernst et al. | |
| 2006/0282662 A1* | 12/2006 | Whitcomb | 713/156 |
| 2007/0016941 A1 | 1/2007 | Gonzalez et al. | |
| 2007/0033419 A1 | 2/2007 | Kocher et al. | |
| 2007/0043667 A1 | 2/2007 | Qawami et al. | |
| 2007/0061528 A1* | 3/2007 | Shibata et al. | 711/162 |
| 2007/0098152 A1 | 5/2007 | Detrick et al. | |
| 2007/0098177 A1* | 5/2007 | Asano et al. | 380/279 |
| 2007/0143445 A1 | 6/2007 | Dandekar et al. | |
| 2007/0180496 A1 | 8/2007 | Fransdonk | |
| 2007/0217604 A1 | 9/2007 | Yanamoto | |
| 2007/0263875 A1* | 11/2007 | Kitaya et al. | 380/279 |
| 2008/0010450 A1 | 1/2008 | Holtzman et al. | |
| 2008/0010455 A1 | 1/2008 | Holtzman et al. | |
| 2008/0013726 A1 | 1/2008 | Kuriya et al. | |
| 2008/0022413 A1 | 1/2008 | Holtzman et al. | |
| 2008/0063309 A1* | 3/2008 | Ohkawa | 382/303 |
| 2008/0189781 A1* | 8/2008 | Pathak et al. | 726/12 |
| 2008/0212780 A1 | 9/2008 | Lemma et al. | |
| 2008/0294908 A1 | 11/2008 | Yamaguchi et al. | |
| 2009/0022320 A1 | 1/2009 | Furukawa et al. | |
| 2009/0041244 A1 | 2/2009 | Lee et al. | |
| 2009/0052670 A1 | 2/2009 | You et al. | |
| 2009/0086978 A1 | 4/2009 | McAvoy et al. | |
| 2009/0113116 A1 | 4/2009 | Thompson et al. | |
| 2009/0119216 A1 | 5/2009 | Dalla Valle | |
| 2009/0249084 A1 | 10/2009 | Ogawa | |
| 2009/0290711 A1* | 11/2009 | Bloom et al. | 380/239 |
| 2010/0034389 A1 | 2/2010 | Sakharov | |
| 2010/0211787 A1 | 8/2010 | Bukshpun et al. | |
| 2010/0275036 A1 | 10/2010 | Harada et al. | |
| 2010/0310075 A1 | 12/2010 | Lin et al. | |
| 2010/0310076 A1 | 12/2010 | Barzilai et al. | |
| 2011/0010720 A1 | 1/2011 | Smith et al. | |
| 2011/0010770 A1 | 1/2011 | Smith et al. | |
| 2012/0023331 A1 | 1/2012 | Altmann | |

FOREIGN PATENT DOCUMENTS

| | | |
|---|---|---|
| JP | 2001-184314 | 7/2001 |
| JP | 2002-169912 | 6/2002 |
| JP | 2003-158514 | 5/2003 |
| JP | 2004-531914 | 10/2004 |
| JP | 2004-326152 | 11/2004 |
| JP | 2005-102021 | 4/2005 |
| JP | 2005-275441 | 10/2005 |
| WO | WO 00/07329 | 2/2000 |
| WO | WO 01/41356 | 6/2001 |
| WO | WO 01/43339 | 6/2001 |
| WO | WO 2007/030760 | 3/2007 |
| WO | 2007144388 A1 | 12/2007 |
| WO | WO 2008/021594 | 2/2008 |
| WO | WO 2009/070430 | 6/2009 |

OTHER PUBLICATIONS

Schneier, B. "Applied Cryptography: Protocols, Algorithms, and Source Code in C", Jan. 1, 1996, pp. 176-177, XP002148578, John Wiley & Sons, New York, U.S.

Office Action from Chinese Patent Application Serial No. 2008801009345, dated Aug. 9, 2012, 21 pages.

Office Action for U.S. Appl. No. 12/478,688, dated Sep. 21, 2012, 14 pages.

Notification of Reasons for Refusal for Japanese Patent Application Serial No. 2010-526993, dated Nov. 13, 2012, 6 pages.

Office Action for U.S. Appl. No. 12/947,034, dated Dec. 3, 2012, 15 pages.

Office Action dated Apr. 21, 2011 issued in European Patent Application No. 08835108.5, 5 pages.

"CPRM and CPXM: Enabling New Business Modes for Robust Delivery of Premium Digital Content," www.4CEntity.com, 4 pages, printed Jun. 1, 2009.

International Search Report and Written Opinion for PCT Application Serial No. PCT/US2010/033666, dated Jul. 15, 2010, 9 pages.

International Search Report and Written Opinion for PCT Application Serial No. PCT/US2010/033669, dated Aug. 6, 2010, 12 pages.

Office Action for U.S. Appl. No. 12/478,688, dated Jul. 7, 2011, 16 pages.

Office Action for U.S. Appl. No. 12/478,688, dated Feb. 22, 2012, 14 pages.

Office Action for U.S. Appl. No. 12/478,691, dated Dec. 27, 2011, 18 pages.

Office Action for U.S. Appl. No. 12/478,691, dated May 9, 2012, 18 pages.

U.S. Appl. No. 12/478,688 entitled, "Method and System for Content Replication Control," filed Jun. 4, 2009, inventors: Jason T. Lin and Fabrice Jogand-Coulomb.

U.S. Appl. No. 12/478,691 entitled, "Method for Performing Double Domain Encryption in a Memory Device", filed Jun. 4, 2009, 28 pages.

U.S. Appl. No. 12/947,034 entitled, "Method and System for Refreshing Content in a Storage Device," filed Nov. 16, 2010, 36 pages.

English Translation of Office Action dated Aug. 24, 2011 issued in Chinese Patent Application No. 2008801009345, 8 pages.

Office Action for U.S. Appl. No. 12/478,688, dated Apr. 24, 2013, 14 pages.

Office Action for U.S. Appl. No. 12/947,034, dated Apr. 29, 2013, 16 pages.

Office Action for European Patent Application Serial No. 08835108.5, dated Apr. 12, 2013, 5 pages.

Decision of Refusal for Japanese Patent Application Serial No. 2010-526993, dated Mar. 12, 2013, 10 pages.

* cited by examiner

SYSTEM AND METHODS FOR DIGITAL CONTENT DISTRIBUTION

TECHNICAL FIELD

The present invention relates to distribution of digital content.

DESCRIPTION OF RELATED ART

Digital content is commonly used in today's computing environment. Digital content may be stored on a storage device (also referred to as storage system), or distributed via electronic communication such as the Internet, Peer-to-Peer software, electronic mail, and others. The Internet and other communication networks today enable various digital appliances and systems (may be referred to as host systems) to interconnect and easily exchange digital content. Host systems may include without limitation, personal computers, laptop computers, tablet computers, personal digital assistants (PDAs), mobile phones, MP3 players, DVD players, gaming consoles, digital recording devices such as digital cameras, and others.

Digital content is typically stored as an electronic file. A digital content file typically includes data that can be viewed, listened to, read, played, executed, or otherwise utilized by an end user using an appropriate application or device. A digital content file may include an audio file, a video file, a multimedia content file, a software file, an electronic book, a document, a computer game, a database, an application, or any other type of digital content. There are different file formats for storing digital content. For example, the MP3, Wav, RealAudio and other file formats may be used to store audio files, while MP4, DIVX®, RealVideo and other formats may be used for storing both audio and video files.

Digital Rights Management (DRM) may be used to protect digital content usage. DRM allows one to limit access to digital content by associating specific permissions to content. A user may be prohibited from making a copy of, distributing, modifying, selling, or performing a copyrighted digital content file, without receiving proper permission from a copyright owner. For example, with respect to an audio file, a license object may grant a paying user permission only to play the file, while a different type of license object may grant additional permissions to copy the file and distribute the file. Different DRM standards may be used for different content types and formats and may provide different methods to distribute digital content and the associated permissions.

Digital content has commercial value for copyright owners, content providers and others. Securing digital content distribution is a challenge because modern networks facilitate mass distribution of digital content.

SUMMARY

The various embodiments of the present system and methods for securing digital content have several features, no single one of which is solely responsible for their desirable attributes. Without limiting the scope of the present embodiments as expressed by the claims that follow, their more prominent features will now be discussed briefly. After considering this discussion, and particularly after reading the section entitled "Detailed Description", one will understand how the features of the present embodiments provide advantages, which include greater efficiency and increased security.

In one embodiment, the present system and methods for securing digital content includes the realization that having a content server encrypt content numerous times for multiple storage devices is burdensome and inefficient. Greater efficiency and security could be achieved if storage devices performed the task of encrypting and decrypting content.

In accordance with the above realizations, one embodiment of the present system and methods for securing digital content comprises a method of transferring encrypted content from a server to a storage device. According to the method the server encrypts the content using a first key. A secure communication channel is established between the server and the storage device using a random session key. The server sends the first key to the storage device via the secure communication channel. The server and the storage device replace the random session key with the first key. The server sends the encrypted content to the storage device via the secure communication channel. The storage device decrypts the encrypted content using the first key, and encrypts the content using a second key. The content is stored on the storage device.

Another embodiment of the present system and methods for securing digital content comprises a method of transferring encrypted content from a server to a storage device. According to the method the server encrypts the content using a first key. A secure communication channel is established between the server and the storage device using a random session key. The server sends the first key to the storage device via the secure communication channel. An open communication channel is established between the server and the storage device. The server sends the encrypted content to the storage device via the open communication channel. The storage device decrypts the encrypted content using the first key, and encrypts the content using a second key. The content is stored on the storage device.

In yet another embodiment, a system for transferring digital content is provided. The system includes a server that has access to the content, and a storage device that can store the content; wherein the server encrypts the content using a first key; establishes a secure communication channel between the server and the storage device using a random session key; sends the first key to the storage device via the secure communication channel; replaces the random session key with the first key; sends the encrypted content to the storage device after the random session key is replaced with the first key; and a cryptographic engine for the storage device decrypts the encrypted content using the first key and re-encrypts the decrypted content using a second key generated by the storage device; and stores the re-encrypted content at the storage device.

In another embodiment, a system for transferring digital content is provided. The system includes a server that has access to the content; and a storage device that can store the content; wherein the server encrypts the content using a first key; establishes a secure communication channel between the server and the storage device using a random session key; sends the first key to the storage device via the secure communication channel; sends the encrypted content to the storage device via an open channel; and a cryptographic engine for the storage device decrypts the encrypted content using the first key and re-encrypts the decrypted content using a second key generated by the storage device; and stores the re-encrypted content at the storage device.

In yet another embodiment, a storage device for securely storing digital content is provided. The storage device includes a cryptographic engine that decrypts and encrypts the content; wherein a server encrypts the content using a first key, establishes a secure communication channel between the server and the storage device using a random session key;

sends the first key to the storage device via the secure communication channel; replaces the random session key with the first key; sends the encrypted content to the storage device after the random session key is replaced with the first key; and the cryptographic engine decrypts the encrypted content using the first key and re-encrypts the decrypted content using a second key generated by the storage device; and the storage device stores the re-encrypted content.

In another embodiment, a storage for securely storing digital content is provided. The storage device includes a cryptographic engine that can encrypt and decrypt the content; wherein a server encrypts the content using a first key; establishes a secure communication channel between the server and the storage device using a random session key; sends the first key to the storage device via the secure communication channel; sends the encrypted content to the storage device via an open channel; and the cryptographic engine decrypts the encrypted content using the first key and re-encrypts the decrypted content using a second key generated by the storage device; and stores the re-encrypted content at the storage device.

This brief summary has been provided so that the nature of the description may be understood quickly. A more complete understanding of the description can be obtained by reference to the following detailed description of the various embodiments thereof in connection with the attached drawings.

BRIEF DESCRIPTION OF THE DRAWINGS

The preferred embodiments of the present system and methods for securing digital content will now be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

To facilitate an understanding of the various embodiments, the general architecture and operation of a system for distributing digital content will first be described. The specific architecture and operations will then be described with reference to the general architecture.

As used in this disclosure, the terms "module" "system", "component" and the like are intended to refer to a computer-related entity, either hardware, a combination of hardware and software, software, or software in execution. For example, a module may be, but is not limited to being, a process running on a processor, a processor, a state machine implemented in hardware, software or a combination thereof, an object, an executable, a thread of execution, a program, and/or a computing system. Computer executable components/modules may be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the claimed subject matter.

Figure 1:
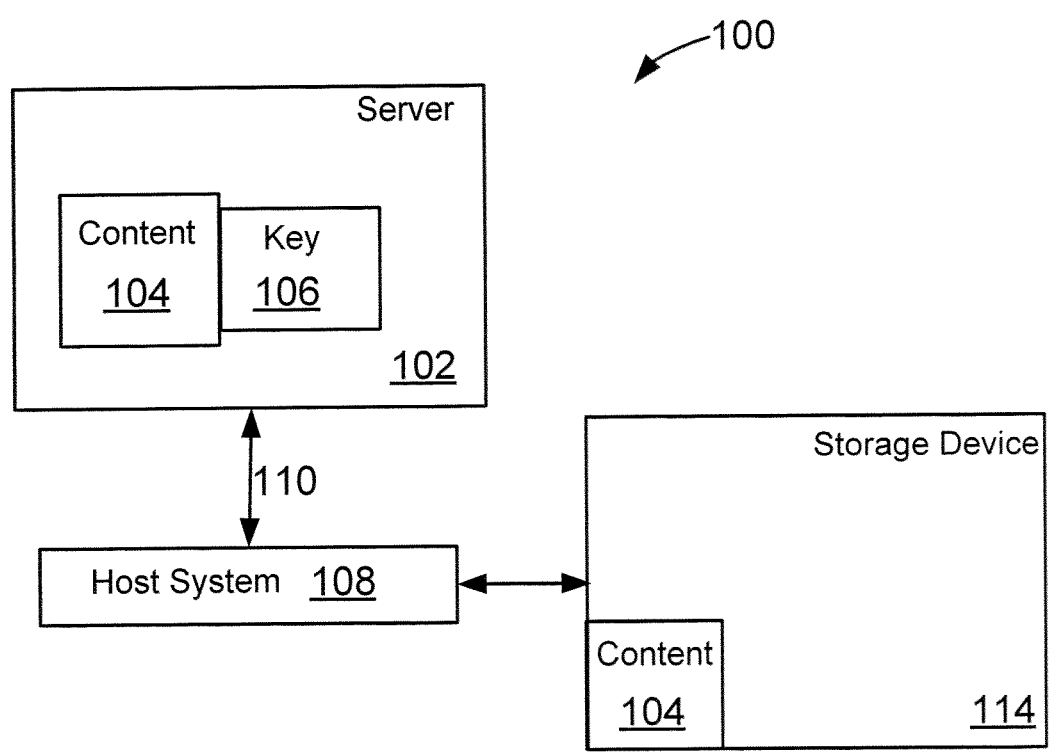
FIG. 1 is a schematic block diagram of a prior art system for securing digital content.

FIG. 1 illustrates an example of a system 100 for securing content in a storage device. System 100 includes server 102 that stores digital content 104 (may be referred to as content 104). Content 104 may be stored locally at server 102 or accessible to server 102 via a network connection (not shown). Server 102 communicates with a computing system (may be referred to as "host system") 108 via a secure channel 110. Server 102 to communicate with host system 108 typically generates a session key (not shown). A storage device (SD) 114, which is coupled to, accessible to or integrated within host 108, stores content 104.

In order to transfer content 104 to SD 114 in a secure manner, server 102 typically encrypts content 104 using a server-generated encryption key 106. Server 102 then sends the encryption key 106 and encrypted content to SD 114 using secure channel 110. Unfortunately, in conventional systems, content 104 is encrypted using a different key 106 whenever content 104 is transferred. The nature and type of encryption key 106 may vary depending on the type of SD 114. Thus, when server 102 transfers content 104 to multiple SD's, server 102 may encrypt content differently to suit the needs of different SD's. This is an unnecessary burden for commercial distribution of digital content. The adaptive embodiments described herein alleviate this burden.

Figure 2A:
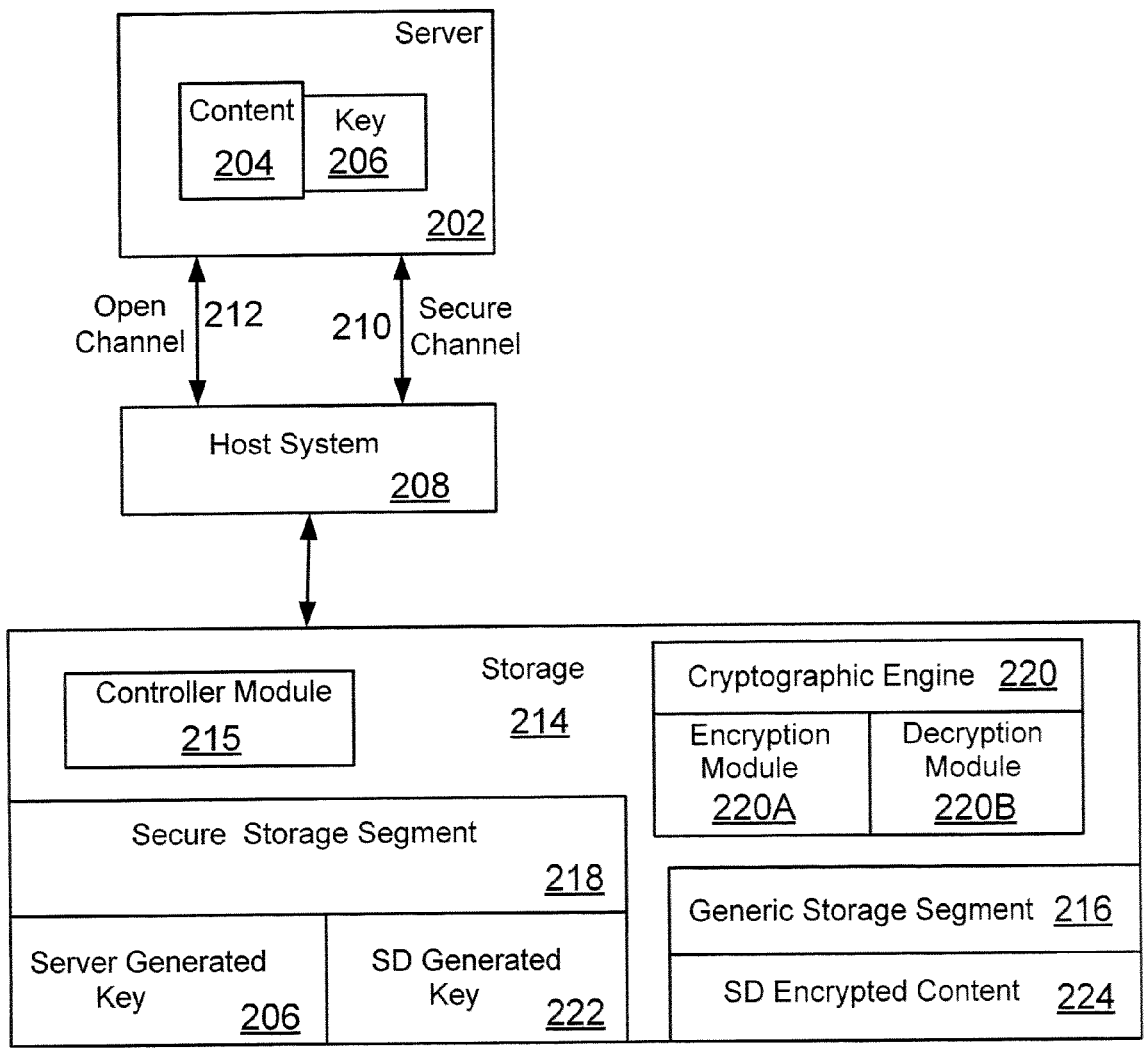
FIG. 2A is a schematic block diagram of one embodiment of the present system and methods for securing digital content.

FIG. 2A illustrates a simplified block diagram of one embodiment of the present system 200 for securely transferring digital content. The system 200 includes a server 202 that stores encrypted content 204. Server 202 uses encryption key 206 to encrypt content 204. Server 202 does not encrypt content every time it has to communicate with a different type of storage device, as described below.

Server 202 communicates with host system 208 via a secure channel 210. The secure channel 210 facilitates secure communication by using a random session key. The random session key may be based on random numbers generated by both server 202 and host system 208. The random numbers may be generated by using specialized hardware, software, or a combination thereof.

In certain embodiments, server 202 may communicate with host system 208 via an open channel 212. Open channel 212 is unsecured and is typically faster than secure channel 210.

In embodiments including both secure channel 210 and open channel 212, the secure channel 210 and the open channel 212 may be capable of transferring data between the server 202 and the host system 208/SD 214 simultaneously. Alternatively, the secure channel 210 and the open channel 212 may not operate simultaneously.

In one embodiment, server 202 uses a random session key to establish secure channel 210.

Host system 208 (and server 2020 typically includes several functional components. These components may include a processor (may also be referred to as a central processing unit (CPU)), main memory, I/O devices and others. The main memory is coupled to the CPU via a system bus or a local memory bus. The main memory is used to provide the CPU access to data and program information at execution time. Typically, the main memory is composed of random access memory (RAM) circuits. A computer system with the CPU and main memory is often referred to as a host system. The term host system as used herein includes personal computers (PCs), laptop and other portable computers, cellular telephones, personal digital assistants (PDAs), digital still cameras, digital movie cameras, portable audio players and others.

Figure 2B:
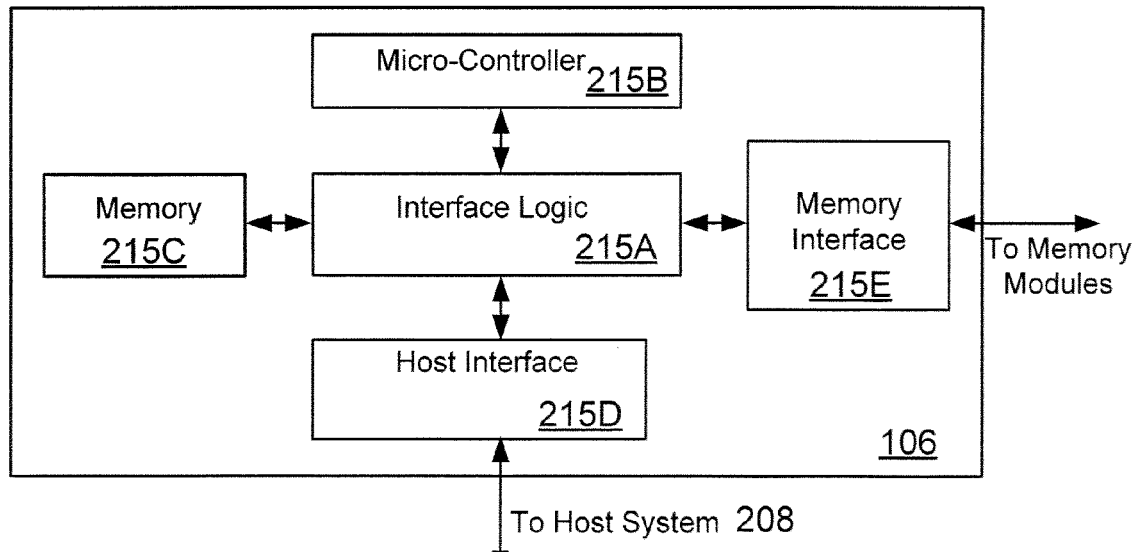
FIG. 2B is a block diagram of a controller.

SD 214 includes a controller 215 and a cryptographic engine 220. Controller 215 controls overall operation of SD 214 and interfaces with host 208 via a host interface 215D (FIG. 2B). Cryptographic engine (or module) 220 encrypts and decrypts content and includes an encryption module 220A and a decryption module 220B. Encryption and decryption may be based on any encryption/decryption technique, for example, AES (Advanced Encryption Standard), DES (Data Encryption Standard), 3DES and others. The adaptive embodiments disclosed herein are not based on any particular type of encryption/decryption technique.

Server 202 sends encryption key 206 to SD 214 via secure channel 210 in a random session using a random session key. The random session key ensures secure transfer of encryption key 206, which is used to decrypt encrypted content 204. After the encryption key 206 is transferred, the random session key is replaced by encryption key 206 and then encrypted content 204 is transferred to SD 214. Decryption module 220B decrypts encrypted content 204 using key 206. Thereafter, encryption module 220A encrypts the decrypted content based on a SD generated encryption key 222.

SD 214 may be any type of storage device, for example, non-volatile memory storage device, hard disk or any other type of storage device. In one embodiment, SD 214 is a removable, non-volatile memory device (including flash memory cards) with solid-state memory modules (or cells). A NAND architecture for memory cell arrays is currently preferred, although other architectures, such as NOR, can also be used instead.

There are currently many different non-volatile memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications (for example, The Universal Serial Bus (USB) specification based interface, incorporated herein by reference in its entirety), the flash memory included in each is very similar. These cards are all available from SanDisk Corporation, assignee of the present application.

SanDisk also provides a line of flash drives under its Cruzer trademark, which are hand held memory systems in small packages that have a Universal Serial Bus (USB) plug for connecting with a host by plugging into the host's USB receptacle (not shown). Each of these memory cards and flash drives includes controllers that interface with the host and control operation of the flash memory within them. The host typically includes a built-in receptacle for one or more types of memory cards or flash drives but some may use adapters into which a memory card is inserted.

In the illustrated embodiment, SD 214 further includes a generic storage module (or segment) 216 and a secure storage module (or segment) 218. In certain methods, the SD 214 may store the encrypted content 204 (as encrypted with the server-generated encryption key 206) in the generic storage module 216, and store the server-generated encryption key 206 in the secure storage module 218.

In one embodiment, SD 214 appears to host system 208 having plural Logical Units (LUNs) of storage space and each LUN may appear to be of a different class of storage device. For example, SD 214 may appear to have both a standard Mass Storage Class volume, which imitates the behavior of a SCSI Hard Disk Drive, and a MMC Class volume, which imitates the behavior of a CD-ROM. Secure storage segment 218 is a hidden area, access to which is based on proper authentication.

FIG. 2B shows a block diagram of the architecture of controller module 215. Controller module 215 includes a microcontroller 215B that interfaces with various other components via interface logic 215A. Memory 215C stores firmware and software instructions that are used by microcontroller 215B to control the operation of SD 214. Memory 21SC may be volatile re-programmable random access memory ("RAM"), a non-volatile memory that is not re-programmable ("ROM"), a one-time programmable memory or a re-programmable flash electrically-erasable and programmable read-only memory ("EFPROM"). A host interface 215D interfaces with host system 208, while a memory interface 215E interfaces with memory modules (not shown).

Figure 3:
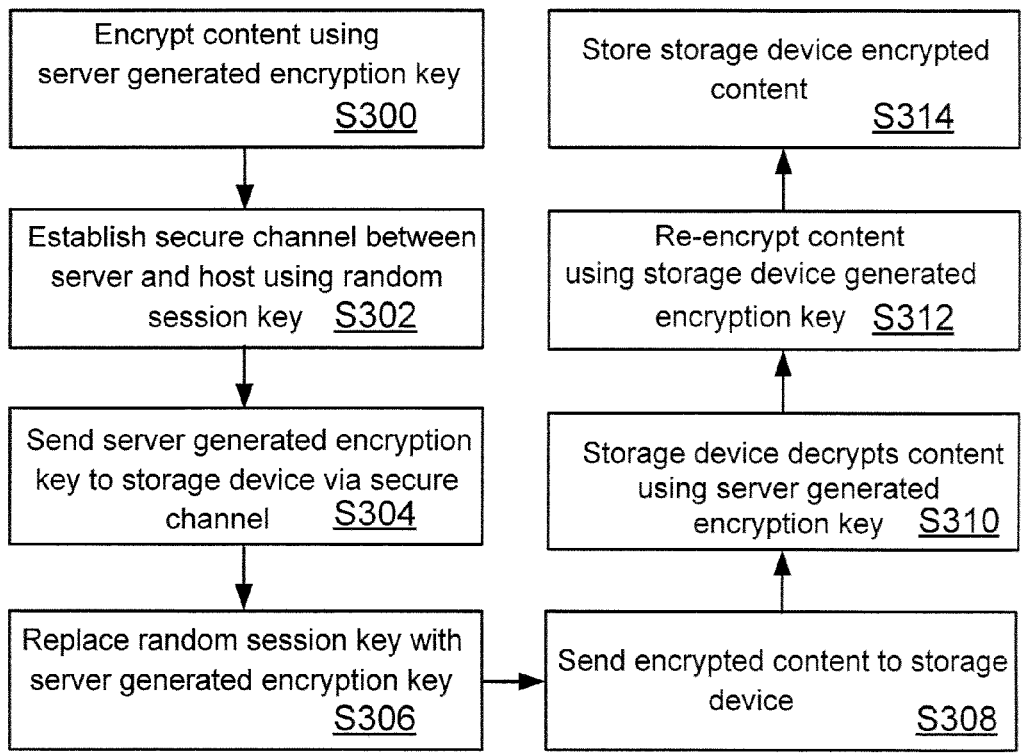
FIG. 3 is a flowchart illustrating one embodiment of the present methods for securing digital content.

In one embodiment of a method for transferring digital content, the server 202 encrypts content 204 using server-generated encryption key 206, as shown at step S300 in FIG. 3. The secure channel 210 is established between server 202 and SD 214 using a random session key at step S302. The server 202 sends the server-generated encryption key 206 to the SD 214 via the secure channel 210, as shown at step S304. The server 202 and the storage device 214 then replace the random session key with the server-generated encryption key 206 at step S306. The server 202 sends the encrypted content 204 via the secure channel 210, as shown at step S308.

The cryptographic engine 220 uses the server-generated encryption key 206 to decrypt the server-encrypted content 204, as shown at step S310 in FIG. 3. At step S312 the cryptographic engine 220 then uses the SD-generated encryption key 222 to re-encrypt the content, which is then stored as SD-encrypted content 224 at step S314. The SD-encrypted content 224 may be stored in the generic storage module 216, while the SD-generated encryption key 222 may be stored in the secure storage module 218.

Figure 4:
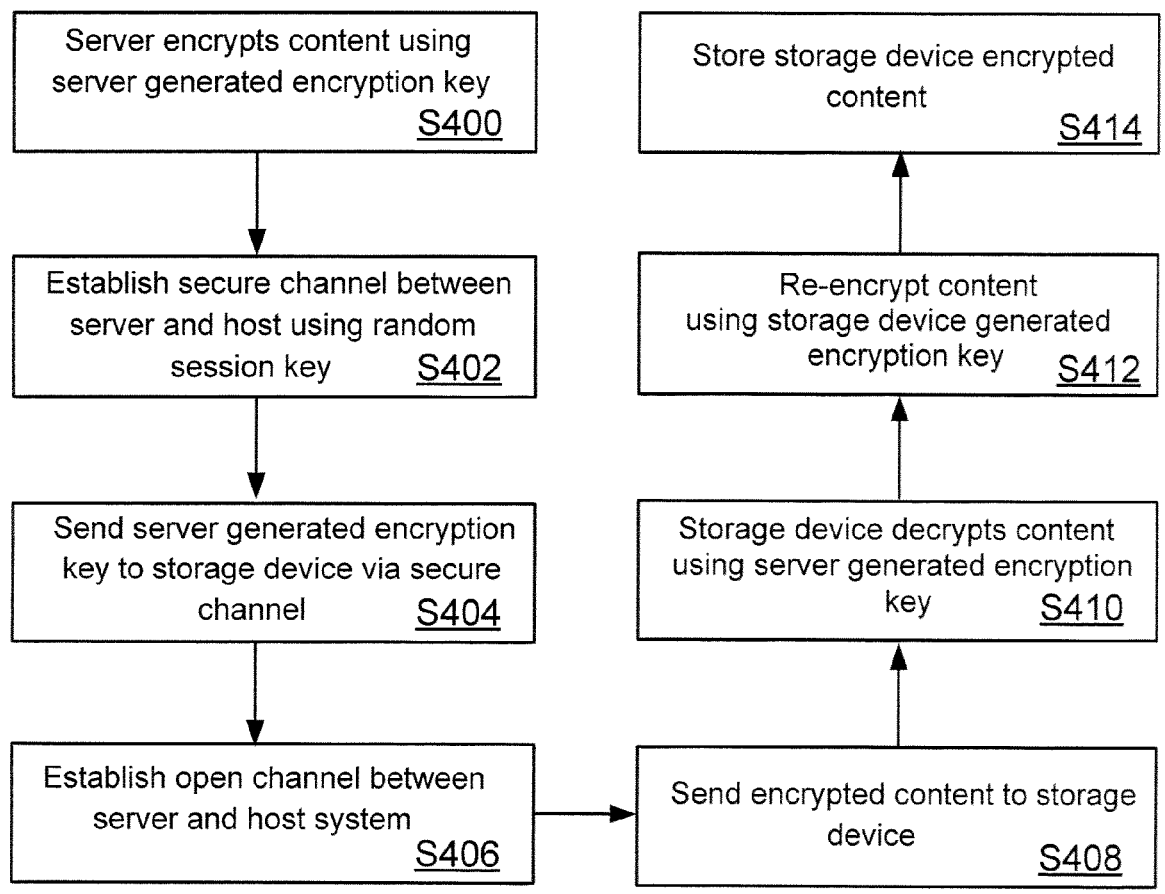
FIG. 4 is a flowchart illustrating another embodiment of the present methods for securing digital content.

FIG. 4 illustrates an alternative method for transferring digital content. The server 202 encrypts the content 204 using the server-generated encryption key 206, as shown at step S400 in FIG. 4. The secure channel 210 is established between the server 202 and the SD 214 using a random session key at step S402. The server 202 sends the server-generated encryption key 206 to the SD 214 via the secure channel 210, as shown at step S404. The server 202 and the storage device 214 then establish the open channel 212 at step S406. The server 202 sends the encrypted content 204 via the open channel 212, as shown at step S408. The cryptographic engine 220 uses the server-generated encryption key 206 to decrypt the server-encrypted content 204, as shown at step S410 in FIG. 4. At step S412 the cryptographic engine 220 then uses the SD-generated encryption key 222 to re-encrypt the content, which is then stored as SD-encrypted content 224 at step S414.

In the system 200 and methods described above, the server 202 advantageously only encrypts the content 204 once, and the content 204 may be encrypted according to whatever encryption scheme the server 202 chooses. The content 204 is then decrypted by the SD 214 using the server-generated encryption key 206. re-encrypted by the SD 214 using the SD-generated encryption key 222, and stored in the SD 214 as SD-encrypted content 224. The SD 214 can encrypt the content 124 according to its own encryption scheme, thereby relieving the server 202 of this task. The present system 200 is thus more efficient than a prior art system in which the server is burdened with the tasks of encrypting multiple content packets according to multiple encryption schemes. Furthermore, the SD-encrypted content 224 is encrypted using the SD-generated encryption key 222, which is known only to the SD 214. The content 224 is thus very secure.

The above description presents the best mode contemplated for carrying out the present system and methods for securing digital content, and of the manner and process of making and using them, in such full, clear, concise, and exact terms as to enable any person skilled in the art to which they pertain to make this system and use these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A method of receiving digital content, the method comprising:
    at a storage device, performing:
        establishing a secure communication channel between the storage device and a server using a random session key;
        receiving a first key from the server via the secure communication channel;
        replacing the random session key with the first key;
        receiving encrypted content from the server after the random session key is replaced with the first key, wherein the first key is independent of a type of the storage device, and wherein the encrypted content corresponds to digital content that has been encrypted using the first key;
        decrypting the encrypted content using the first key, wherein the storage device decrypts the encrypted content;
        re-encrypting the decrypted content using a second key generated by the storage device; and
        storing the re-encrypted content at the storage device.

2. The method of claim 1, wherein the second key is known only to the storage device.

3. The method of claim 1, wherein the server generates the first key.

4. The method of claim 1, wherein the re-encrypted content is stored in a generic storage module of the storage device.

5. The method of claim 1, further comprising storing the second key in the storage device.

6. The method of claim 1, wherein the second key is stored in a secure storage module of the storage device.

7. The method of claim 1, wherein the storage device is a non-volatile memory device.

8. A method of receiving digital content, the method comprising:
    at a storage device, performing:
        establishing a secure communication channel between a server and the storage device using a random session key;
        receiving a first key from the server via the secure communication channel, wherein the first key is independent of a type of the storage device;
        receiving encrypted content from the server via an open communication channel, wherein the encrypted content corresponds to digital content that has been encrypted using the first key;
        decrypting the encrypted content using the first key instead of using the random session key, as the encrypted content is received via the open communication channel and not the secure communication channel;
        re-encrypting the decrypted content using a second key generated by the storage device; and
        storing the re-encrypted content at the storage device.

9. The method of claim 8, wherein the second key is known only to the storage device.

10. The method of claim 8, wherein the re-encrypted content is stored in a generic storage module of the storage device.

11. The method of claim 8, further comprising storing the second key on the storage device.

12. The method of claim 8, wherein the second key is stored in a secure storage module of the storage device.

13. The method of claim 8, wherein the storage device is a non-volatile memory device.

14. A storage device to store digital content, the storage device comprising:
    a cryptographic engine configured to decrypt encrypted content using a first key, wherein the storage device is configured to receive the first key while the storage device is operatively coupled to a server via a secure communication channel between the storage device and the server, wherein the first key is received via the secure communication channel and wherein the secure communication channel is established using a random session key, wherein the storage device is further configured to replace the random session key with the first key and to receive the encrypted content from the server after replacing the random session key with the first key, wherein the encrypted content corresponds to digital content that has been encrypted using the first key,
    wherein the cryptographic engine is configured to re-encrypt the decrypted content using a second key generated by the storage device; and
    a memory to store the re-encrypted content at the storage device.

15. The system of claim 14, wherein the second key is known only to the storage device.

16. The system of claim 14, wherein the server generates the first key.

17. The system of claim 14, wherein the re-encrypted content is stored in a generic storage module of the storage device.

18. The system of claim 14, wherein the second key is stored in a secure storage module of the storage device.

19. The system of claim 14, wherein the storage device is a non-volatile memory device.

20. A memory card to store digital content, the memory card comprising:
    a cryptographic engine configured to decrypt encrypted content using a first key, wherein the memory card is configured to receive the first key while the memory card is operatively coupled to a server via a secure communication channel between the memory card and the server, wherein the first key is received via the secure communication channel and wherein the secure communication channel is established using a random session key, wherein the memory card is further configured to replace the random session key with the first key and to receive the encrypted content from the server after replacing the random session key with the first key, wherein the encrypted content corresponds to digital content that has been encrypted using the first key, wherein the cryptographic engine is configured to re-encrypt the decrypted content using a second key generated by the memory card; and a memory to store the re-encrypted content at the memory card.

21. The memory card of claim 20, wherein the second key is known only to the memory card.

22. The memory card of claim 20, wherein the first key is generated by the server.

23. The memory card of claim 20, wherein the re-encrypted content is stored in a generic storage module of the memory card.

24. The memory card of claim 20, wherein the second key is stored in a secure storage module of the memory card.

25. The memory card of claim 20, wherein the memory card is a non-volatile memory device.

26. A storage device for securely storing digital content, comprising:

a cryptographic engine that decrypts and encrypts the digital content, wherein the storage device is configured to establish a secure communication channel with a server once the storage device is coupled to the server using a random session key, the digital content is encrypted in the server using a first key, wherein the storage device is further configured to receive the first key via the secure communication channel, wherein the first key is independent of a characteristic of the storage device and is the first key replaces the random session key, wherein the storage device is further configured to receive the encrypted content after the random session key is replaced with the first key;

wherein the cryptographic engine is configured to decrypt the encrypted content using the first key and to re-encrypt the decrypted content using a second key generated by the storage device; and a memory for storing the re-encrypted content.

27. The storage device of claim 26, wherein the second key is known only to the storage device.

28. The storage device of claim 26, wherein the characteristic of the storage device comprises a type of the storage device.

29. The storage device of claim 26, wherein the re-encrypted content is stored in a generic storage module of the storage device.

30. The storage device of claim 26, wherein the second key is stored in a secure storage module of the storage device.

31. The storage device of claim 26, wherein the storage device is a non-volatile memory device.

32. A memory card for securely storing digital content, comprising:

a cryptographic engine that can encrypt and decrypt the digital content, wherein the memory card is configured to establish a secure communication channel with a server once the memory card is coupled to the server, the secure communication channel using a random session key, the digital content is encrypted in the server using a first key, the memory card is further configured to receive the first key via the secure communication channel, and wherein the memory card is further configured to receive the encrypted content via an open channel, wherein the first key is independent of a type of the memory card;

wherein the cryptographic engine is configured to decrypt the encrypted content using the first key instead of using the random session key, as the encrypted content is received via the open channel and not the secure communication channel, and to re-encrypt the decrypted content using a second key generated by the memory card; and a memory for storing the re-encrypted content at the memory card.

33. The memory card of claim 32, wherein the second key is known only to the memory card.

34. The memory card of claim 32, wherein the server generates the first key.

35. The memory card of claim 32, wherein the re-encrypted content is stored in a generic storage module of the memory card.

36. The memory card of claim 32, wherein the second key is stored in a secure storage module of the memory card.

37. The memory card of claim 32, wherein the memory card includes a flash memory.

38. A method of receiving digital content, the method comprising:

in a memory card, performing:

establishing a secure communication channel with a server using a random session key;

receiving first content including the encrypted first encryption key from the server via the secure communication channel;

decrypting the first content to retrieve the first encryption key using the random session key;

replacing the random session key with the first encryption key;

receiving second encrypted content from the server;

decrypting the second encrypted content using the first encryption key;

re-encrypting the content using a second key; and storing the re-encrypted content in the memory card.

39. The method of claim 38, wherein the memory card has a mechanical configuration in accordance with a CompactFlash specification.

40. The method of claim 38, wherein the memory card has a mechanical configuration in accordance with a Secure Digital (SD) specification.

41. A memory card comprising:

a controller configured to receive an encrypted first encryption key from a server and encrypted content from the server via a communication channel using a random session key while the memory card is operatively coupled to a host device;

a cryptographic engine configured to:

retrieve a first encryption key by decrypting the encrypted first encryption key using the random session key;

replace the random session key with the first encryption key;

decrypt the encrypted content using the first encryption key and re-encrypt the content using a second key using a second key, the second key generated by the memory card; and a memory device configured to store the re-encrypted content.

42. The memory card of claim 41, wherein the encrypted content is received via an open communication channel.

43. The memory card of claim 41, wherein the cryptographic engine includes an encryption module and a decryption module, wherein the decryption module decrypts the encrypted content using the first encryption key, and wherein the encryption module re-encrypts the content using the second key.

44. The memory card of claim 41, wherein the second key is stored in a secure storage module of the memory card.

45. The memory card of claim 41, wherein the memory device comprises a non-volatile memory device.

46. The memory card of claim 41, wherein the memory device includes a flash memory and wherein the memory card is configured to be removably coupled to the host device.

47. The method of claim 1, wherein the storage device has a first device type, wherein the server is configured to encrypt and send the first key to a second storage device having a second device type different from the first device type, and wherein the server is further configured to send the encrypted content to the second storage device to be decrypted using the first key.

48. The method of claim 38, wherein the memory card has a first device type and receives the encrypted content from the server, wherein the server is configured to encrypt and send the first key to a storage device having a second device type different from the first device type, and wherein the server is further configured to send the encrypted content to the storage device to be decrypted using the first key.

49. The method of claim 8, further comprising receiving additional content from the server via the secure communication channel simultaneously with receiving the encrypted content from the server via the open communication channel.

* * * * *

UNITED STATES PATENT AND TRADEMARK OFFICE
CERTIFICATE OF CORRECTION

| | | |
|---|---|---|
| PATENT NO. | : 8,761,402 B2 | Page 1 of 1 |
| APPLICATION NO. | : 11/863714 | |
| DATED | : June 24, 2014 | |
| INVENTOR(S) | : Paul McAvoy et al. | |

It is certified that error appears in the above-identified patent and that said Letters Patent is hereby corrected as shown below:

In the Claims

Column 10, claim 41, line 52, after "encryption key using" replace "the" with --a--.

Column 10, claim 41, line 57, replace "key and" with --key; and--.

Signed and Sealed this
Fourteenth Day of October, 2014

Michelle K. Lee
*Deputy Director of the United States Patent and Trademark Office*